United States Patent Office 2,827,659
Patented Mar. 25, 1958

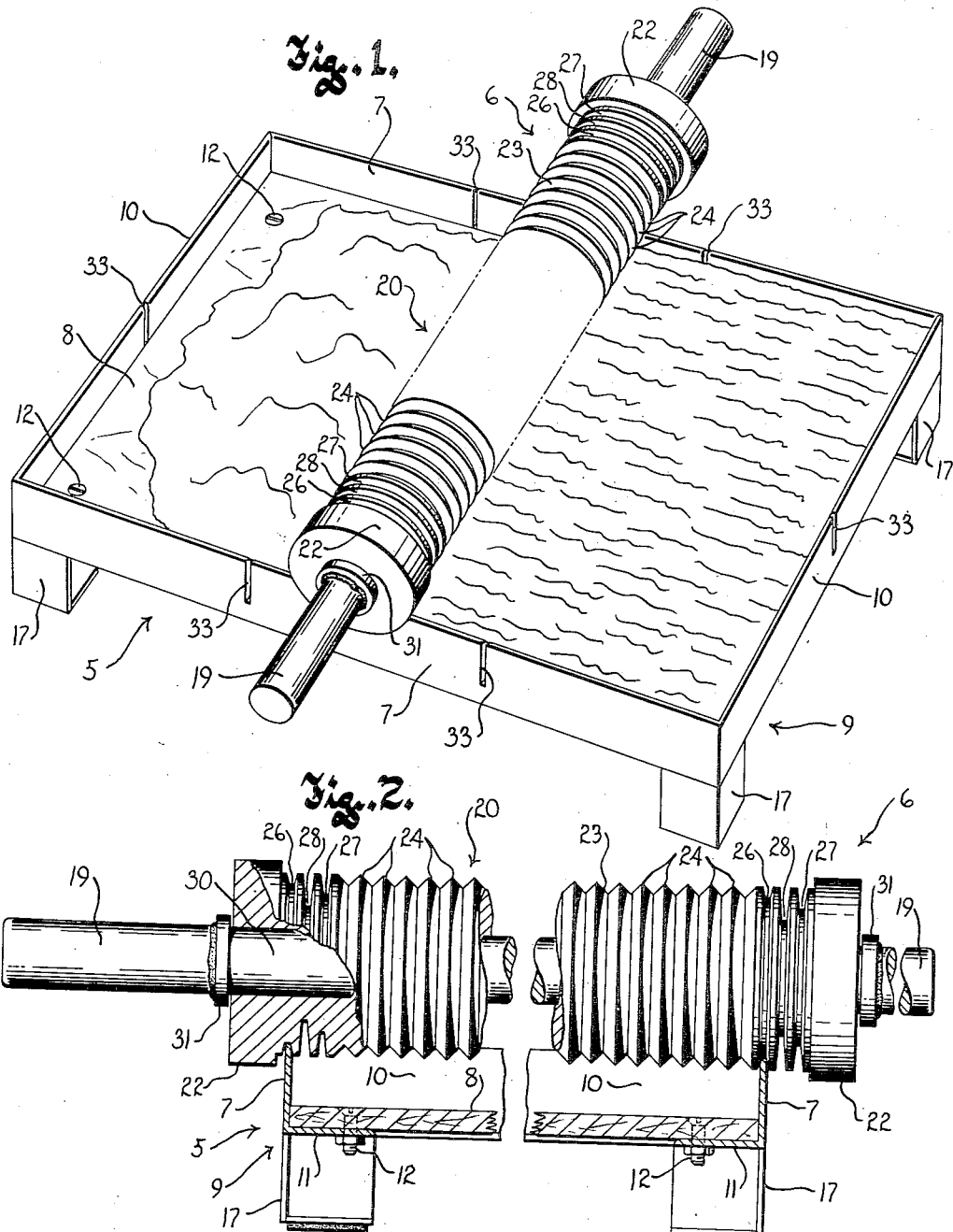

2,827,659

MEAT PATTY ROLLER

Louis J. Rabun, Milwaukee, Wis., assignor of one-third to Robert H. Superior, Milwaukee, Wis.

Application September 10, 1956, Serial No. 608,843

1 Claim. (Cl. 17—32)

This invention relates to meat patty presses and has more particular reference to presses of the type in which chopped meat and the like may be pressed into patties of substantially uniform size and thickness and, at the same time, have an attractive non-planar surface configuration imparted thereto.

It is a purpose of this invention to provide a meat patty press comprising a tray having a flat bottom with a pair of opposite upright sides of equal height, and a roller adapted to be revolubly supported on the upper edges of the tray sides so as to cooperate with the bottom of the tray in levelling out and pressing ground meat or other similar food material placed in the tray to a uniform thickness as the roller is revolved along the opposite sides of the tray.

More specifically, it is an object of this invention to provide a meat patty press comprising a combination tray and roller wherein the roller has a circumferentially serrated exterior providing axially equispaced annular teeth thereon along the major portion of its length and by which a unique and attractive surface configuration may be imparted to the chopped meat or other food material placed in the tray as the roller is revolved along the opposite sides of the tray.

Still another object of this invention resides in the provision of a combination tray and roller of the character described, wherein pairs of grooves of different depths in the end portions of the roller are adapted to receive the upper edge portions of the tray sides to provide for revolubly supporting the roller on the rails with the serrated exterior of the roller disposed different predetermined distances above the bottom of the tray, thus making it possible to produce patties of different thicknesses in the press.

A further purpose of this invention resides in the provision of a tray for a meat patty press of the character described having pairs of opposite side walls projecting upwardly from a flat bottom of non-metallic material such as wood, and wherein opposite slots are formed in opposing tray sides to receive and guide a knife blade by which the meat or other food material pressed in the tray may be cut into patties of predetermined size.

With the above and other objects in view, which will appear as the description proceeds, this invention resides in the novel construction, combination and arrangement of parts substantially as hereinafter described and more particularly defined by the appended claim, it being understood that such changes in the precise embodiment of the hereindisclosed invention may be made as come within the scope of the claim.

The accompanying drawing illustrates one complete example of the physical embodiment of the invention constructed according to the best mode so far devised for the practical application of the principles thereof and in which:

Figure 1 is a perspective view of the meat patty press of this invention, indicating ground meat or other food material in the press and partly shaped by the roller thereof; and Figure 2 is an enlarged cross sectional view through the tray and illustrating the roller partly in side elevation and partly in section.

Referring now more particularly to the accompanying drawing in which like reference characters have been applied to like parts, it will be seen that the meat press of this invention comprises two main components, namely, a tray 5 to receive meat to be pressed, and a roller 6. The roller is adapted to be supported by two opposite upright sides 7 of the tray and to cooperate with the bottom 8 thereof in pressing meat in the tray to uniform thickness as a consequence of revolving motion of the roller along the upright sides 7.

Preferably, though not necessarily, the bottom 8 of the tray is provided by a flat non-metallic rectangular panel, in this case shown as made of wood, and a metallic framework 9 provides pairs of opposite side and end walls 7 and 10, respectively, on the tray. The framework is comprised of angle-shaped members having horizontal flanges 11 underlying and secured to the marginal edge portions of the bottom 8, as by bolts 12, and the upright flanges of these angle-shaped members lie against the peripheral edges of the body and provide the opposite upright side and end walls 7 and 10. The upright flanges 7 and 10 are all of the same height and their upper edges lie in a common plane parallel to the bottom 8. As will be more fully described hereinafter, the upper edge portions of the two opposite longitudinal sides 7 of the tray provide rails for revolubly supporting the roller 6 on the tray, in the manner indicated in Figure 1.

If desired, short legs 17 may be secured to the underside of the tray at its corners in order to support the tray at an elevation above the surface of a work table or the like such as will enable the operator of the press to readily grasp handles 19 projecting from the opposite ends of the roller, and by which the latter may be rolled back and forth along the length of the tray.

The roller comprises a cylindrical main or body portion 20, from which the handles 19 project in coaxial relationship to the body member. In the construction illustrated, the body member is in the form of a sleeve having slightly enlarged annular end portions 22 and having a circumferentially serrated exterior 23 which provides axially equispaced annular teeth 24 thereon extending along the major length of the body portion, nearly up to the enlargements 22 on its ends.

Just inwardly of the end portions 22, the roller is provided with a plurality of circumferential grooves 26, 27 and 28 of different depths, and which provide for revolubly supporting the roller on the rails provided by the opposite longitudinal sides 7 of the tray at different predetermined distances from the bottom 8 of the tray. For this purpose, each of the grooves in one end portion of the body member cooperates with one of the grooves in the opposite end portion of the body member to provide a pair of grooves of corresponding depth and spaced axially a distance equal to the spacing of the rails 7.

As illustrated best in Figure 2, the grooves 26 are substantially shallow, while the grooves 28 have maximum depth. The grooves 27 have a depth which is intermediate the depths of the grooves 26 and 28. With this construction, when the rails are engaged in the shallowest grooves 26, as shown in Figure 2, the serrated surface of the body member will be held spaced a maximum distance above the bottom 8 of the tray and chopped meat or other food material thereon will be pressed to a uniform maximum thickness as the roller is revolved along the rails. Meat patties of minimum thickness may be produced by engaging the rails in the notches 28 which have maximum depth, and this may be accomplished merely by lifting the roller to disengage the rails from the shallow grooves 26, shifting the roller axially to the left, and engaging the rails in the deepest grooves 28 in the end portions of the roller. For meat patties of intermediate thickness, the roller is indexed further to the left to receive the rails in its grooves 27 of intermediate depth.

It is important to note that the engagement of the rails in the different sets of grooves in the end portions of the roller not only predetermines the thickness of the meat patties to be pressed, but also holds the roller against axial shifting, transversely of the tray, and thus effects guiding of the revolving motion of the roller along the length of the tray.

The body member 20 has been shown in the form of a sleeve, while the handles 19 have been shown provided by the opposite end portions of a shaft 30 projecting lengthwise through the sleeve and freely rotatably mounting the sleeve thereon. With this construction, it is desirable of course, to preclude axial motion of the body member 20 relative to the handles, and this may be accomplished as by affixing annular shoulders 31 to the exterior of the handles directly adjacent to the opposite end portions of the body member. Obviously, if desired, the roller may be constructed of a solid body portion having handles rotatably journalled in its end portions in any suitable manner. Preferably, however, the roller is made of some light weight metal such as aluminum.

With the construction described, chopped meat or other food material to be pressed is placed in the tray and the roller is mounted on the rails provided by the longitudinal sides 7 of the tray, with the rails engaged in one of the sets of grooves 26, 27 or 28 in the end portions of the body member of the roller, depending upon the desired thickness of the meat patties. The operator then grasps the handles 19 of the roller and advances the latter lengthwise along the rails, and as it rolls thereon it will press the food material in the bottom of the tray to uniform thickness but at the same time, impart a non-planar or ridged surface configuration to the food material.

After the pressing operation is completed, the food material may be cut into patties of a predetermined size and this is facilitated by the provision of sets of opposite slits 33 in the opposing sides of the tray. These slits are adapted to receive and guide the knife blade employed for the cutting operation. As an example, if the tray is made approximately eight inches (8") wide and twelve (12") long, six patties each of about 3½" square may be formed in the press of this invention.

From the foregoing description taken together with the accompanying drawing, it will be readily appreciated that this invention provides an improved meat press by which meat patties or other food material may be formed and shaped to any of a number of predetermined uniform thickness, while at the same time, having a distinctive surface configuration imparted thereto.

What I claim as my invention is:

A roller for a meat patty press of the type having a flat supporting surface upon which the meat to be pressed may be laid and having opposite parallel flanges projecting upwardly from spaced portions of said supporting surface, said roller comprising: a substantially cylindrical body member having a circumferentially serrated exterior providing axially equispaced annular teeth along the major length of the body portion; handles projecting coaxially from the opposite ends of said body member and connected therewith so as to provide for free rotation of the body member relative to the handles; cooperating means on the handles and the end portions of the body member interengaging with one another to preclude relative axial movement between the body member and the handles; and means for revolubly supporting the body member on a pair of spaced flanges with the serrated exterior of the body member spaced different predetermined distances from a supporting surface between the flanges, said means comprising a plurality of axially adjacent circumferential grooves of different depths in each end portion of the body member, each groove in one end portion of the body member cooperating with one of the grooves in the opposite end portion of the body member to provide a pair of grooves of corresponding depth spaced axially a uniform distance equal to the spacing of the flanges which are to revolubly support the roller and in which said flanges may be received to hold the body member a definite distance above the supporting surface between the flanges.

References Cited in the file of this patent
UNITED STATES PATENTS

| | | |
|---|---|---|
| 1,462,717 | Maus | July 24, 1923 |
| 1,534,907 | Broecker | Apr. 21, 1925 |
| 1,807,009 | Pinnelli | May 26, 1931 |
| 2,181,666 | Molin | Nov. 28, 1939 |